(12) United States Patent
Hong et al.

(10) Patent No.: US 7,209,276 B2
(45) Date of Patent: Apr. 24, 2007

(54) FISHBONE DIFFRACTION-TYPE LIGHT MODULATOR

(75) Inventors: Yoon Shik Hong, Gyeonggi-do (KR); Seung Do An, Gyeonggi-do (KR); Seung Heon Han, Seoul (KR); Hyun Ju Yi, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/244,562

(22) Filed: Oct. 6, 2005

(65) Prior Publication Data

US 2006/0082854 A1   Apr. 20, 2006

(30) Foreign Application Priority Data

Oct. 15, 2004   (KR) .................. 10-2004-0082753

(51) Int. Cl.
*G02B 26/00* (2006.01)
(52) U.S. Cl. ..................................... 359/237

(58) Field of Classification Search ................ 359/290, 359/291, 292, 295, 298, 214, 320, 322, 323, 359/558, 566, 569, 572, 573
See application file for complete search history.

(56) References Cited

U.S. PATENT DOCUMENTS 5,311,360 A    5/1994  Bloom et al.
6,712,480 B1 *  3/2004  Leung et al. ............... 359/846

* cited by examiner

*Primary Examiner*—Ricky L. Mack
*Assistant Examiner*—Tuyen Tra
(74) *Attorney, Agent, or Firm*—Christensen O'Connor Johnson Kindness PLLC

(57) ABSTRACT

Disclosed is a fishbone diffraction-type light modulator. In the fishbone diffraction-type light modulator, a lower micromirror is provided on a silicone substrate, and an upper micromirror is spaced apart from the silicone substrate and has a plurality of openings through both sides thereof. The upper micromirror and the lower micromirror deposited on the silicone substrate form pixels.

4 Claims, 4 Drawing Sheets

FISHBONE DIFFRACTION-TYPE LIGHT MODULATOR

BACKGROUND OF THE INVENTION

1. Field of the Invention

The present invention relates, in general, to a diffraction-type light modulator and, more particularly, to a fishbone diffraction-type light modulator, in which a lower micromirror is provided on a silicone substrate, and an upper micromirror is spaced apart from the silicone substrate and has a plurality of openings through both sides thereof, so that the upper micromirror and the lower micromirror form pixels.

2. Description of the Prior Art

Generally, optical signal processing technology has advantages in that a great amount of data is quickly processed in a parallel manner unlike a conventional digital information processing technology in which it is impossible to process a large amount of data in real-time, and studies have been conducted on the design and production of a binary phase only filter, an optical logic gate, a light amplifier, an image processing technique, an optical device, and a light modulator using a spatial light modulation theory.

Of them, the spatial light modulator is applied to optical memory, optical display, printer, optical interconnection, and hologram fields, and studies have been conducted to develop displays employing it.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a substrate 16, and are spaced apart from each other at regular intervals. An insulating layer 11 is deposited on the silicon substrate 16. Subsequently, a sacrificial silicon dioxide film 12 and a silicon nitride film 14 are deposited.

The nitride film 14 is patterned by the ribbons 18, and a portion of the silicon dioxide film 12 is etched, thereby maintaining the ribbons 18 on an oxide spacer layer 12 using a nitride frame 20.

In order to modulate light having a single wavelength of $\lambda_o$, the modulator is designed so that thicknesses of the ribbon 18 and oxide spacer 12 are each $\lambda_o/4$.

Limited by the vertical distance (d) between the reflective surface 22 of each ribbon 18 and the reflective surface of the substrate 16, the grating amplitude of the modulator 10 is controlled by applying a voltage between the ribbon 18 (the reflective surface 22 of the ribbon 18 acting as a first electrode) and the substrate 16 (a conductive layer 24 of a lower side of the substrate 16 acting as a second electrode).

In its undeformed state, with no voltage applied, the grating amplitude is $\lambda_o/2$, and the total round-trip path difference between light beams reflected from the ribbon and substrate is one wavelength $\lambda_o$, and thus, the phase of the reflected light is reinforced.

Accordingly, in its undeformed state, the modulator 10 acts as a plane mirror when it reflects light. In FIG. 2, reference numeral 20 denotes incident light and reflected light in its undeformed state.

When a proper voltage is applied between the ribbon 18 and substrate 16, the electrostatic force enables the ribbon 18 to be moved downward toward a surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference.

The modulator diffracts incident light 26 resulting from the interference. In FIG. 3, reference numerals 28 and 30 denote light beams diffracted in a +/− diffractive mode (D+1, D−1) in a deformed state.

However, the Bloom's light modulator adopts an electrostatic method to control the position of the micromirror, which has disadvantages in that the operating voltage is relatively high (usually, 30 V or so) and the correlation between the applied voltage and the displacement is not linear, resulting in unreliable light control.

A light modulator disclosed in the patent of Bloom may be used as a device for displaying images. In this regard, at least two adjacent elements may form one pixel. Needless to say, three, four, or six elements may form one pixel.

However, the light modulator according to the patent of Bloom has a limit of miniaturization. In other words, it is impossible to reduce the width of the element of the light modulator to 3 μm or less, or to reduce an interval between the elements to 0.5 μm or less.

Furthermore, the formation of diffraction pixels using the elements requires at least two elements, thus the light modulator has a limit of miniaturization of the device.

SUMMARY OF THE INVENTION

Therefore, the present invention has been made keeping in mind the above disadvantages occurring in the prior arts, and an object of the present invention is to provide a fishbone diffraction-type light modulator, in which a lower micromirror is provided on a silicone substrate, and an upper micromirror is spaced apart from the silicone substrate and has a plurality of openings through both sides thereof, so that the upper micromirror and the lower micromirror form pixels.

The above object can be accomplished by providing a fishbone diffraction-type light modulator. The fishbone diffraction-type light modulator comprises a substrate; a lower micromirror layer, which is layered on a portion of a surface of the substrate to reflect or diffract incident light; a pair of supporting members provided on the surface of the substrate; a diffraction member suspended on the lower micromirror layer at a central portion thereof, which is attached to one pair of supporting members at both ends thereof and which has a fishbone shape so that openings are formed through both sides of the central portion thereof suspended on the lower micromirror layer, thereby reflecting or diffracting the incident light by the distance between the lower micromirror layer and the diffraction member; and a driving unit moving a central portion of an upper micromirror layer, through which the openings are formed, upward or downward.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of the present invention, with reference to FIGS. 4 to 8.

Figure 1:
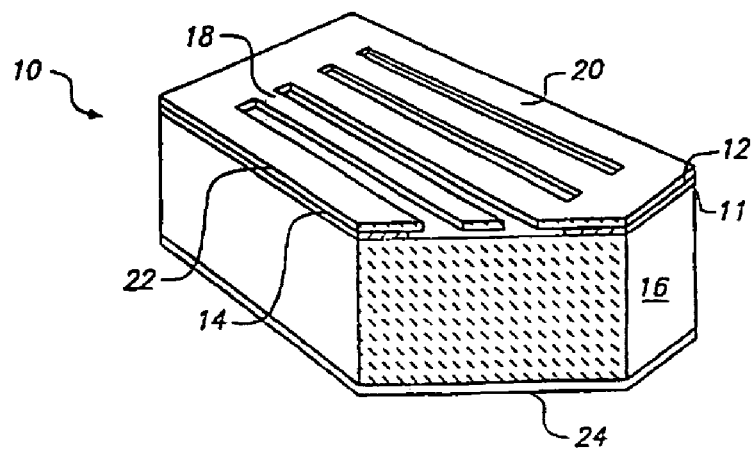
FIG. 1 illustrates an electrostatic-type grating light modulator according to conventional technology.
Figure 2:
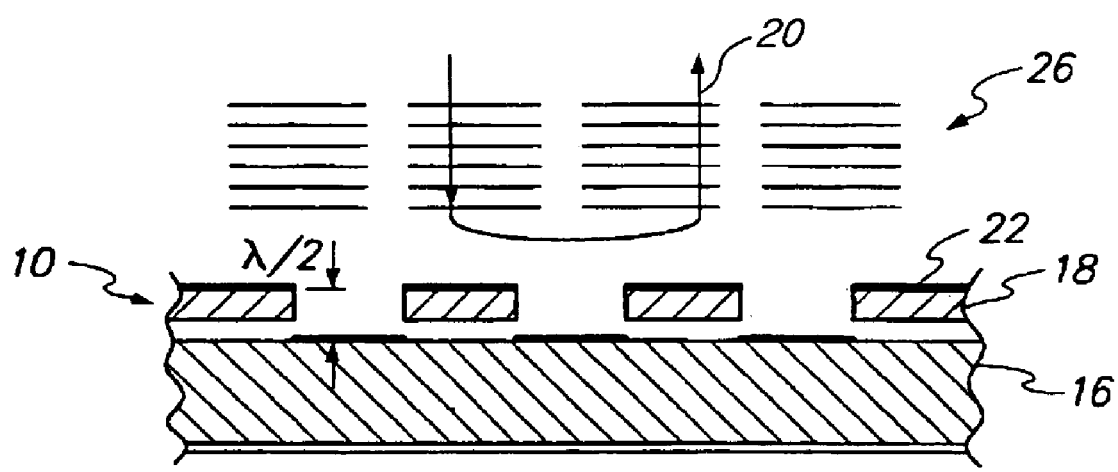
FIG. 2 illustrates reflection of incident light by the electrostatic-type grating light modulator in an undeformed state according to conventional technology.
Figure 3:
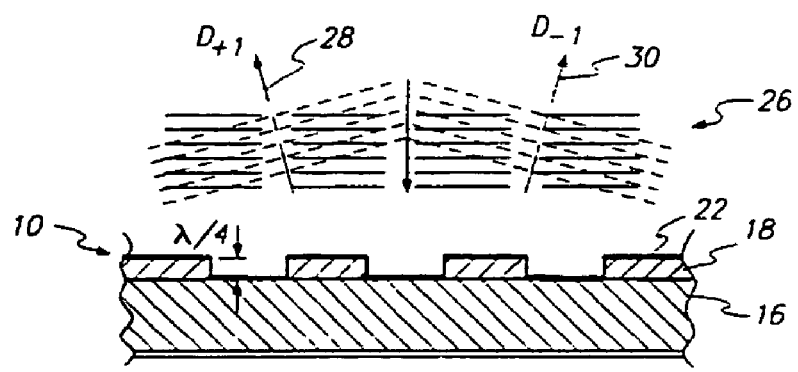
FIG. 3 illustrates diffraction of incident light by the grating light modulator in a deformed state due to electrostatic force, according to conventional technology.
Figure 4:
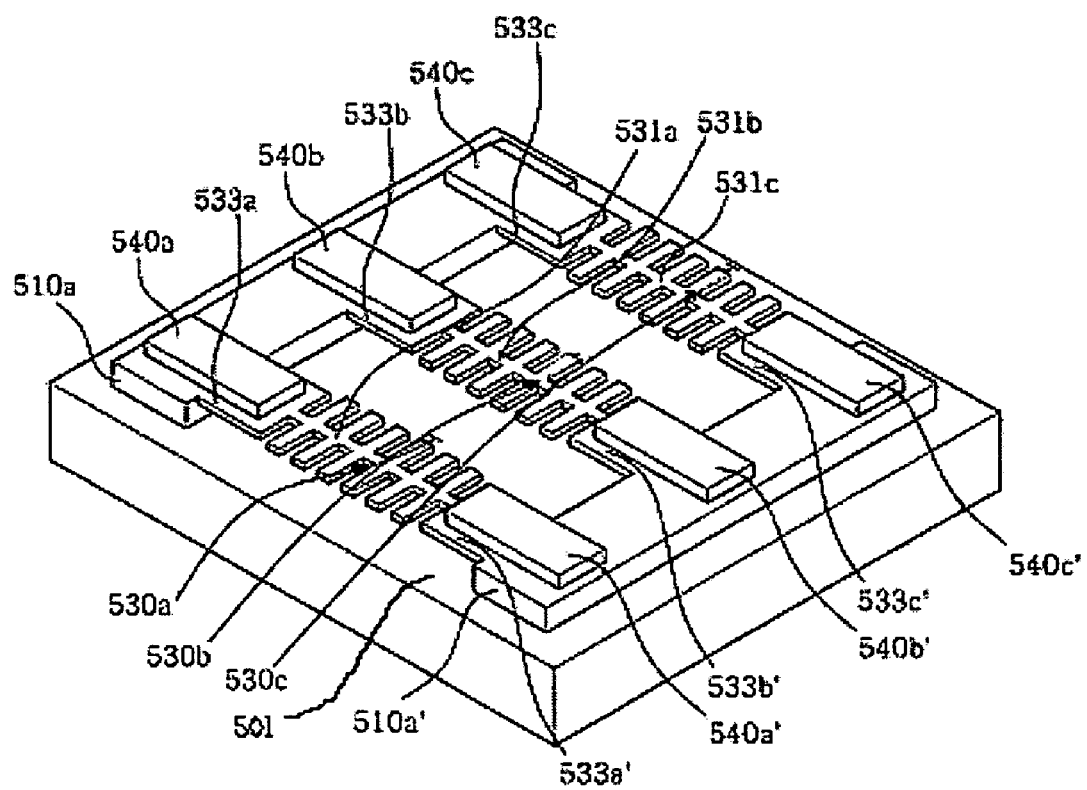
FIG. 4 is a perspective view of a fishbone diffraction-type light modulator according to the present invention.

FIG. 4 is a perspective view of a fishbone diffraction-type light modulator according to the present invention.

Referring to FIG. 4, the fishbone diffraction-type light modulator according to the present invention comprises a substrate 500, a pair of supporting members 510a, 510a', a plurality of diffraction members 530a–530c, and a plurality of driving units 540a–540c, 540a'–540c'.

The substrate 500 is thinly coated with reflective material reflecting light on an upper side thereof, thereby forming a lower micromirror and reflecting incident light.

A pair of supporting members 510a, 510a' are opposite each other and attached to the substrate 500, and support the diffraction members 530a–530c.

The diffraction members 530a–530c are attached to side ends of the supporting members 510a, 510a' at both ends thereof, and include pairs of driving parts 533a–533c, 533a'–533c', connection parts 531a–531c, and a plurality of diffraction branches 532a–532c, 532a'–532c'.

The driving units 540a–540c, 540a'–540c' are attached to the supporting members 510a, 510a' at first ends thereof, and attached to the driving parts 533a–533c, 533a'–533c' at second ends thereof.

Figure 8:
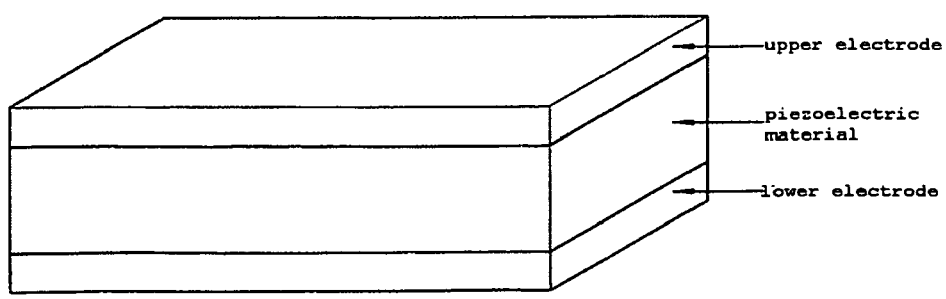
FIG. 8 is a perspective view of a driving unit of FIG. 4.

As shown in FIG. 8, the driving units 540a–540c, 540a'–540c' each include a lower electrode, a piezoelectric material layer layered on the lower electrode, and an upper electrode layered on an upper side of the piezoelectric material layer. If voltage is applied to the upper electrodes of the driving units 540a–540c, 540a'–540c', the piezoelectric material layers laterally shrink. At this time, first ends of the piezoelectric material layers are fixed to the supporting members 510a, 510a', thus the first ends of the piezoelectric material layers do not shrink. However, since second ends of the driving units 540a–540c, 540a'–540c' are attached to the driving parts 533a–533c, 533a'–533c', shrinkage force is applied to the driving parts 533a–533c, 533a'–533c'. Since the driving parts 533a–533c, 533a'–533c' are capable of moving upward or downward, the driving parts 533a–533c, 533a'–533c' are lifted by the shrinkage of the driving units 540a–540c, 540a'–540c'. Accordingly, when voltage is applied to the driving units 540a–540c, 540a'–540c', the driving parts 533a–533c, 533a'–533c' are lifted, resulting in the lifted diffraction members 530a–530c.

Meanwhile, the diffraction members 530a–530c are arranged parallel to each other, and moved upward or downward by the driving units 540a–540c, 540a'–540c' as described above. Material for the diffraction members 530a–530c may be exemplified by Si oxides (e.g. $SiO_2$), Si nitrides (e.g. $Si_3N_4$), ceramic substrates (Si, $ZrO_2$, $Al_2O_3$), or Si carbides. It is preferable to use rigid material in order to maintain flatness when the diffraction members 530a–530c move upward or downward.

The diffraction members 530a–530c include connection parts 531a–531c to connect the first and second driving parts 533a–533c, 533a'–533c' to each other.

A plurality of diffraction branches 532a–532c, 532a'–532c' protrudes from both sides of the connection parts 531a–531c.

Surfaces of the diffraction members 530a–530c are thinly coated with reflective materials, thereby forming upper micromirrors. The upper micromirrors reflect incident light.

Figure 5:
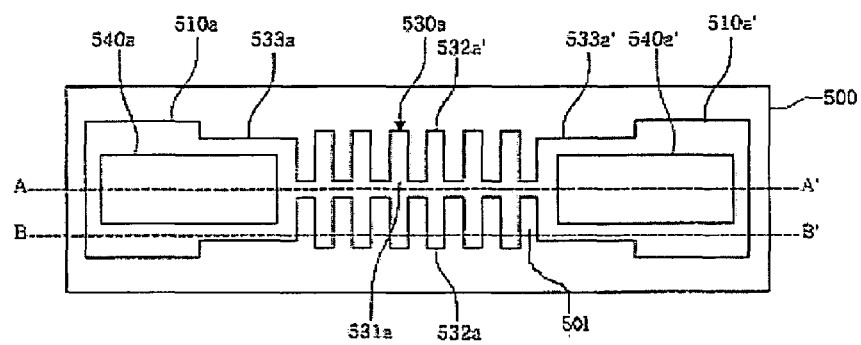
FIG. 5 is a plane view of the fishbone diffraction-type light modulator of FIG. 4.

FIG. 5 is a plane view of the fishbone diffraction-type light modulator of FIG. 4, which shows the diffraction member 530a of FIG. 5 in detail. A description of reference numeral 530a of FIG. 5 is identically applied to reference numerals 530b, 530c denoting the diffraction members.

Referring to FIG. 5, the partial plane view of the fishbone diffraction-type light modulator shows that the driving units 540a, 540a' are provided on the supporting members 510a, 510a' at first ends thereof and on the driving parts 533a, 533a' at second ends thereof.

Furthermore, the plurality of diffraction branches 532a–532a' of the diffraction member 530a protrudes from the connection part 531a, thus forming a fishbone shape. In the present invention, shapes of both diffraction branches 532a, 532a' are symmetrical with each other.

Additionally, the plurality of diffraction branches 532a, 532a' of the diffraction member 530a is almost perpendicular to the diffraction member, thus increasing light efficiency.

Figure 6:
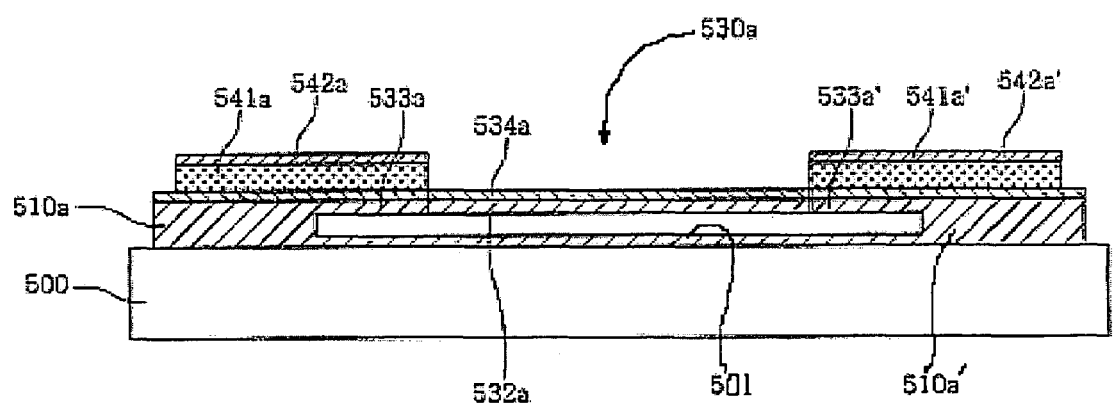
FIG. 6 is a sectional view taken along the line A–A' of FIG. 5.

FIG. 6 is a sectional view taken along the line A–A' of FIG. 5, and shows the lower micromirror 501 which is made of the reflective material thinly applied to a surface of the substrate 500.

Furthermore, FIG. 6 shows the upper micromirror 534a made of the reflective material thinly applied to a surface of the diffraction member 530a.

The driving units 540a, 540a' comprise the lower electrodes consisting of the upper micromirror 534a (which is the same as FIG. 8 in terms of constitution), the piezoelectric material layers 541a, 541a' which are provided on the supporting members 510a, 510a' at first ends thereof and on the driving parts 533a, 533a' at second ends thereof, and the upper electrodes 542a, 542a' layered on the piezoelectric material layers 541a, 541a'.

With respect to this, as shown in FIG. 8, the driving units 540a, 540a' may comprise additional lower electrodes instead of the lower electrodes consisting of the upper micromirror 534a.

Electrode material for the lower electrodes (the additional lower electrodes) may be exemplified by Pt, Ta/Pt, Ni, Au, Al, or $RuO_2$, and the electrode material is deposited in a thickness of 0.01–3 μm in using a sputtering or evaporation process.

The piezoelectric material layers 541a, 541a' may be formed in a thickness of 0.01–20.0 μm through a wet process (screen printing, sol-gel coating or the like) or a dry process (sputtering, evaporation, MOCVD, vapor deposition or the like). Any of upper and lower piezoelectric materials and left and right piezoelectric materials may be used as the piezoelectric material layers. The piezoelectric material may be exemplified by PZT, PNN-PT, PLZT, AlN, or ZnO, and piezoelectric electrolytic material containing at least one of Pb, Zr, Zn, or titanium may be used.

As well, electrode material for the upper electrodes 542a, 542a' may be exemplified by Pt, Ta/Pt, Ni, Au, Al, Ti/Pt, $IrO_2$, or $RuO_2$, and the upper electrodes are formed in a thickness of 0.01–3 μm using the sputtering or evaporation process.

Material for the upper or lower micromirror 534a, 501 is exemplified by light-reflective material, such as Ti, Cr, Cu, Ni, Al, Au, Ag, Pt, or Au/Cr.

Figure 7A:
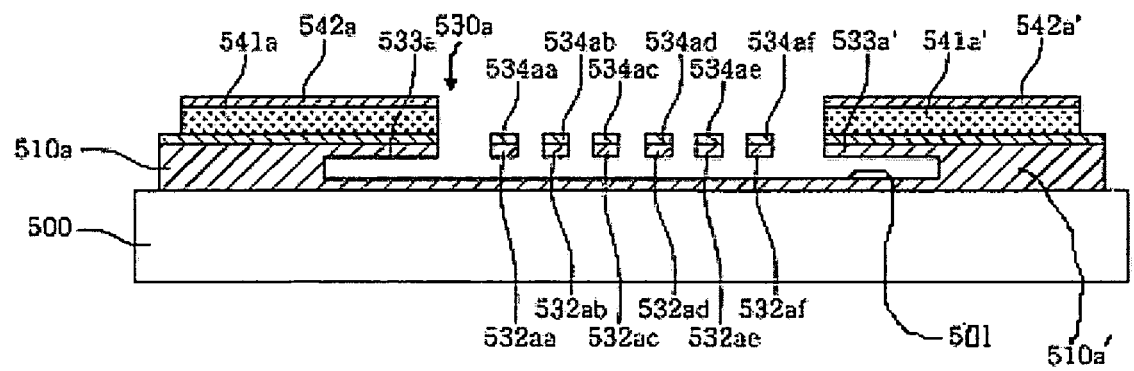
FIG. 7A is a sectional view taken along the line B–B' of FIG. 5, in which driving voltage is not applied to the fishbone diffraction-type light modulator according to the present invention.
Figure 7B:
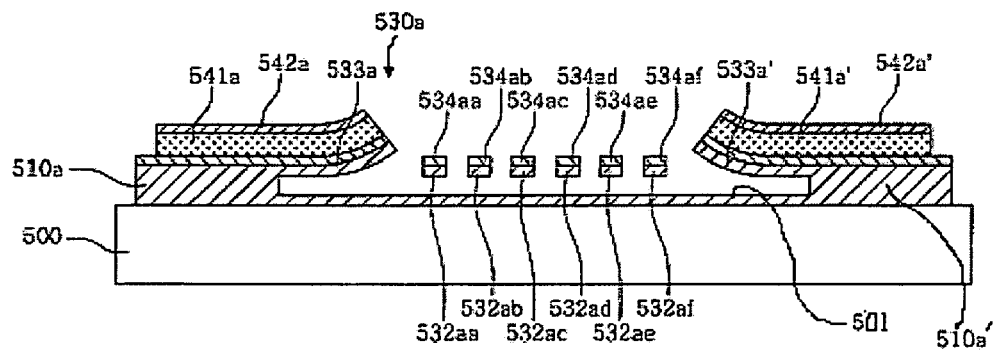
FIG. 7B is a sectional view taken along the line B–B' of FIG. 5, in which the driving voltage is applied to the fishbone diffraction-type light modulator according to the present invention.

FIG. 7A is a sectional view taken along the line B–B' of FIG. 5, in which driving voltage is not applied to the fishbone diffraction-type light modulator according to the present invention, and FIG. 7B is a sectional view taken along the line B–B' of FIG. 5, in which the driving voltage is applied to the fishbone diffraction-type light modulator according to the present invention.

With reference to FIG. 7A, when the driving voltage is not applied to the fishbone diffraction-type light modulator according to the present invention, the distance between a plurality of upper micromirror pieces 534aa–534af on a plurality of diffraction branches 532aa–532af and the lower micromirror 501 is designed to be $\lambda/2$ if the wavelength of incident light is $\lambda$. Needless to say, the above distance is an example, and the distance may be multiples of $\lambda/2$, or multiples of $\lambda/4$ so that diffraction of incident light occurs.

As described above, if the distance between the upper micromirror pieces 534aa–534af and the lower micromirror 501 is designed to be $\lambda/2$, light beams, which are reflected from the upper micromirror pieces 534aa–534af and from the lower micromirror 501 after passing between the upper micromirror pieces 534aa–534af, do not form diffracted light.

Therefore, the upper micromirror pieces 534aa–534af and the lower micromirror 501 act as a reflecting mirror.

FIG. 7B is a sectional view taken along the line B–B' of FIG. 5, in which the driving voltage is applied to the fishbone diffraction-type light modulator according to the present invention.

Referring to FIG. 7B, when the voltage is applied to the first and second driving units 540a, 540a' of the fishbone diffraction-type light modulator according to the present invention, the piezoelectric material layers 541a, 541a' of the first and second driving units shrink, thereby moving the driving parts 533a, 533a' upward.

When the first and second driving parts 533a, 533a' are moved upward, the diffraction member 530a is moved upward. At this time, if the voltage applied to the driving units 540a, 540a' is appropriately controlled, when the wavelength of incident light is $\lambda$, it is possible to design the distance between the upper micromirror pieces 534aa–534af and the lower micromirror 501 to be multiples of $\lambda/4$.

For example, if the distance between the upper micromirror pieces 534aa–534af and the lower micromirror 501 is $\lambda/4$, light reflected from the upper micromirror pieces 534aa–534af forms diffracted light in conjunction with light reflected from the lower micromirror 501 after passing between the upper micromirror pieces 534aa–534af.

Meanwhile, in FIGS. 7A and 7B, when the driving voltage is not applied to the driving units 540a, 540a', the distance between the upper micromirror pieces 534aa–534af and the lower micromirror 501 is designed to be multiples of $\lambda/2$ with an assumption that the wavelength of incident light is $\lambda$, thereby generating only reflected light. However, when the wavelength of incident light is $\lambda$, it is possible to design the distance between the upper micromirror pieces 534aa–534af and the lower micromirror 501 so as to be multiples of $\lambda/4$, thereby generating diffracted light. If only reflected light, and not diffracted light is needed, when the driving voltage is applied to the driving units 540a, 540a', the distance between the upper micromirror pieces 534aa–534af and the lower micromirror 501 is designed so as to be multiples of $\lambda/2$ with the assumption that the wavelength of incident light is $\lambda$.

Furthermore, in the present invention, the fishbone diffraction-type light modulator uses a piezoelectric driving method, but electrostatic driving and electromagnetic driving methods may also be employed. This is based on the fact that the fishbone diffraction-type light modulator according to the present invention is characterized in that grooves are formed on both ends of a diffraction member so as to improve diffraction efficiency.

As described above, the present invention is advantageous in that the number of diffraction branches applied to a structure is not limited and the area of a connection part generating only reflected light is minimized, thereby improving diffraction efficiency.

Furthermore, the minimum driving volume is assured by controlling the diffraction branch number and the connection part area, and resonance frequency efficiency per unit driving displacement is increased, thus it is possible to produce a diffraction-type light modulator having improved response characteristics per unit driving displacement.

Although a fishbone diffraction-type light modulator according to the present invention has been disclosed for illustrative purposes, those skilled in the art will appreciate that various modifications, additions and substitutions are possible, without departing from the scope and spirit of the invention as disclosed in the accompanying claims.

What is claimed is:

1. A fishbone diffraction-type light modulator, comprising:
   a substrate;
   a lower micromirror layer, which is layered on a portion of a surface of the substrate to reflect or diffract incident light;
   a pair of supporting members provided on the surface of the substrate;
   a diffraction member suspended on the lower micromirror layer at a central portion thereof, which is attached to the one pair of supporting members at both ends thereof and which has a fishbone shape so that openings are formed through both sides of the central portion thereof suspended on the lower micromirror layer, thereby reflecting or diffracting the incident light by a distance between the lower micromirror layer and the diffraction member; and
   a driving unit moving a central portion of an upper micromirror layer, through which the openings are formed, upward or downward.

2. The fishbone diffraction-type light modulator as set forth in claim 1, wherein the driving unit moves the diffraction member so that the diffraction member moves between a first position, in which the diffraction member and the lower micromirror layer form a horizontal mirror, and a second position, in which the diffraction member and the lower micromirror layer diffract the incident light.

3. The fishbone diffraction-type light modulator as set forth in claim 1, wherein the diffraction member comprises:
   a pair of driving parts, which are connected to the supporting members at outer ends thereof and which are moved by the driving unit upward or downward;
   a connection part connecting the one pair of driving parts therethrough; and
   a plurality of diffraction branches, which protrudes from both side ends of the connection part to reflect or diffract the incident light.

4. The fishbone diffraction-type light modulator as set forth in claim 3, wherein the diffraction branches protrude from and are perpendicular to the connection part.

* * * * *